June 2, 1931. H. C. PICCOLINI 1,808,679
ELASTIC MATTRESS AND OTHER DEVICE FOR REPOSE OF THE BODY
Filed March 29, 1929 2 Sheets-Sheet 1
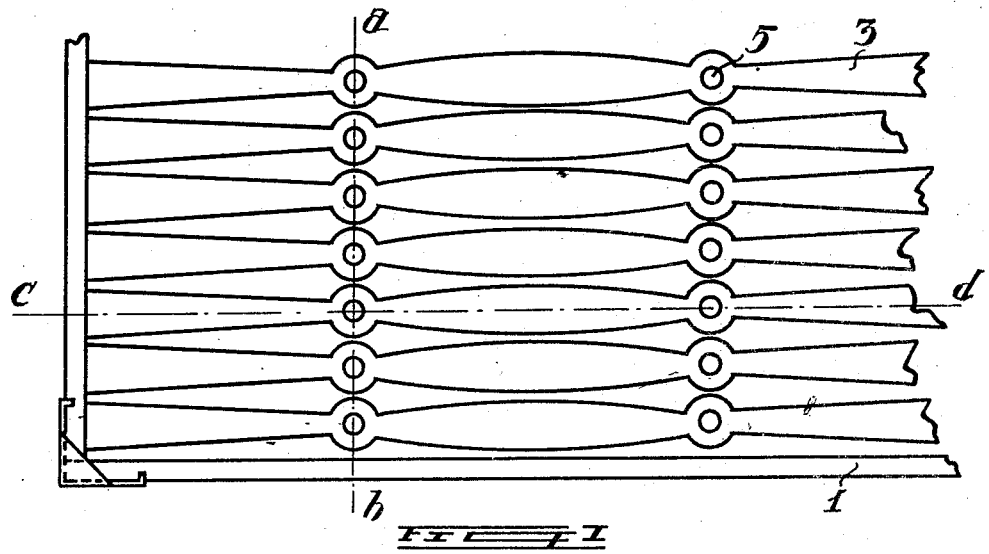
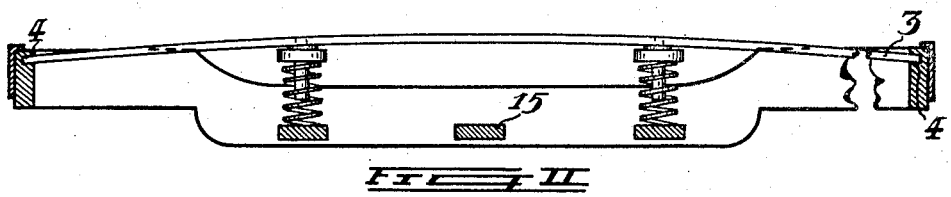
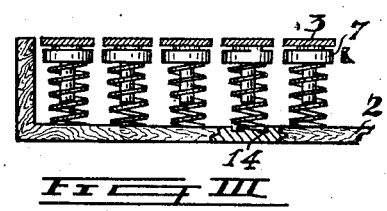
Inventor
H. C. Piccolini,
By Langner, Parry, Card & Langner
ATTYS.

June 2, 1931. H. C. PICCOLINI 1,808,679
ELASTIC MATTRESS AND OTHER DEVICE FOR REPOSE OF THE BODY
Filed March 29, 1929 2 Sheets-Sheet 2
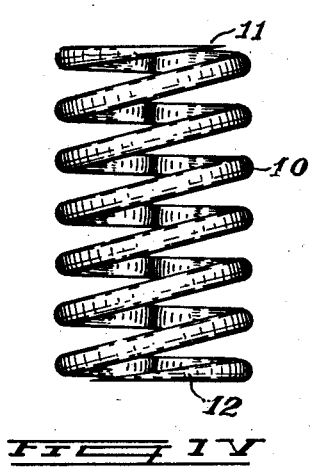
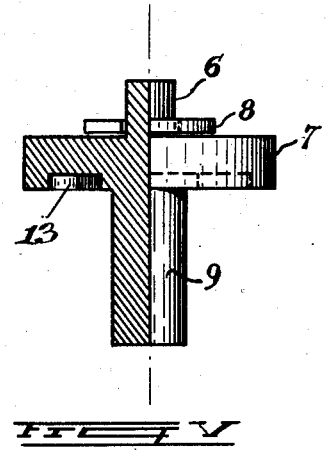
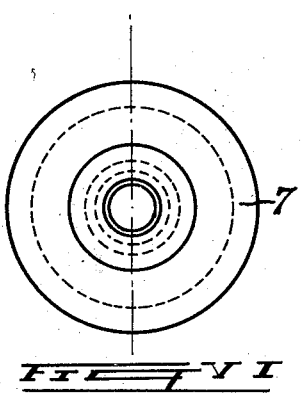
Inventor
H. C. Piccolini,
ATTYS.

Patented June 2, 1931

1,808,679

UNITED STATES PATENT OFFICE

HÉCTOR CÓRSICO PICCOLINI, OF BUENOS AIRES, ARGENTINA

ELASTIC MATTRESS AND OTHER DEVICE FOR REPOSE OF THE BODY

Application filed March 29, 1929. Serial No. 351,100.

This invention relates to improvements in elastic bed bottoms and similar devices and a main object is to provide a structure which is highly resilient and in which the various elements thereof are independent in their movements from the other elements.

A further object is to provide a new and novel support for the cross bars constituting the bed bottom.

With these and other objects in view, as will become apparent as the description proceeds, the invention consists in the combination and arrangement of parts set forth below, claimed in the claims and described in the drawings, in which Figure 1 is a partial plan view of the improved bed bottom;

Figure 2 is a lonigtudinal section on the line c—d of Figure 1;

Figure 3 is a cross section taken on the line a—b of Figure 1;

Figure 4 is an elevational view of one of the springs;

Figure 5 is a part elevational and part sectional view of the supporting device; and Figure 6 is a plan view of the supporting device.

Referring to the drawings, 1 indicates the bed frame having a bottom composed of slats 2 and ends and sides. In the ends a groove 4 is provided in which the ends of the cross bars 3 are secured in any desired manner. The cross bars 3 are independent of one another and extend parallel to one another and are provided at spaced intervals with apertures 5.

The supporting member 7 shown particularly in Figure 5 is provided with an upwardly extending projection 6 which is adapted to be seated and exends into the apertures 5 upon the cross bars 3. Directly below the projection 6 the supporting member is provided with an enlarged disk-like member and projecting downwardly from this disk-like member is an extension or guiding member 9. The lower surface of the disk member upon the supporting member 7 is provided with a circular groove 13.

Referring to Figure 3 the slats 2 are provided with circular grooves 14 similar to the grooves 13 and in alinement with the grooves 13 when the supporting members have the projection 6 extending into the aperture 5 upon the cross bars 3. The helical spring 10 shown particularly in Figure 4 has flat ends 11 and 12. The end 11 is designed to be seated in the groove 13 while the end 12 is designed to be seated in the groove 14. A rubber washer 8 is supported on the disk member of the supporting member 7 and encircles the upwardly extending projection 6.

In assembling the device the frame work is first assembled and then the cross bars 3 are secured at their ends in the grooves 4 upon the ends of the frame work. The springs 10 are then seated with their ends 12 in the grooves 14 upon the slats 2 and the projection 6 with the washer 8 thereon is inserted through an aperture 5 while the downwardly extending projection 9 extends into the spring 10 while the end 11 is disposed inside the groove 13. This provides a highly elastic bed bottom in which the various bars 3 are independent and have independent flexibility. The projections 9, it will be noted from Figure 3, do not extend the entire length of the spring, but allow a fairly large amount of liberty of movement. However, if an excess weight is disposed upon the bed bottom, the guiding members 9 will remove excess strain upon the springs and will prevent the adjacent portions of the spring from contacting and thereby causing the disagreeable metallic sound which is present in a great many constructions. The supporting devices 7 are disposed preferably in regular parallel rows. However, if an excessive load is placed upon the bed bottom structure, cross bars 15 may be provided in addition to the slats 2 which will aid in supporting such excessive weights. Of course in such case the cross bars 15 are provided with circular grooves 14.

It is of course understood that the above described embodiment of my invention is at present the preferred structure, but it is evident that various modifications and changes may be made therein and it is my intention to include all such modifications and rearrangements as will come within the scope of the following claim.

Having thus described the invention, what is claimed as new is:

An elastic bed bottom comprising a frame having side and end members, horizontal grooves disposed in said end members, bottom slats for said frame, flexible supporting rods having their ends secured in said grooves, said rods having spaced apertures therein, supporting members having projections extending upwardly into said apertures, rubber washers disposed about said projections below said apertures, disk portions upon said supporting members having downwardly directed grooves therein, said slats being provided with grooves aligned with said last mentioned grooves, said supporting members having downwardly directed guiding elements and spiral springs seated in said slat grooves and said downwardly directed grooves upon said supporting members and being guided by said guiding elements.

In testimony whereof he has signed his name to this specification.

HÉCTOR CÓRSICO PICCOLINI.